United States Patent
DuFresne et al.

(10) Patent No.: US 12,520,945 B2
(45) Date of Patent: Jan. 13, 2026

(54) CHAIR OR SEAT ASSEMBLY WITH SENSOR AND ILLUMINATION

(71) Applicant: Anthro Form, LLC, Waukesha, WI (US)

(72) Inventors: Steven DuFresne, Hartland, WI (US); Kent Solberg, Whitefish Bay, WI (US)

(73) Assignee: Anthro Form, LLC, Waukesha, WI (US)

( * ) Notice: Subject to any disclaimer, the term of this patent is extended or adjusted under 35 U.S.C. 154(b) by 171 days.

(21) Appl. No.: 18/332,488

(22) Filed: Jun. 9, 2023

(65) Prior Publication Data

US 2023/0397733 A1    Dec. 14, 2023

Related U.S. Application Data

(60) Provisional application No. 63/351,279, filed on Jun. 10, 2022.

(51) Int. Cl.

| | | |
|---|---|---|
| *A47C 1/032* | (2006.01) | |
| *A47C 7/72* | (2006.01) | |
| *A47C 31/00* | (2006.01) | |
| *A47C 31/11* | (2006.01) | |

(52) U.S. Cl.
CPC .......... *A47C 7/725* (2013.01); *A47C 1/03255* (2013.01); *A47C 31/008* (2013.01); *A47C 31/11* (2013.01)

(58) Field of Classification Search
CPC ......... A47C 7/725; A47C 3/026; A47C 1/024; A47C 1/0242; A47C 1/03255; A47C 1/03261; A47C 1/03266; B60N 2/0029; B60N 2/003; B60N 2210/50
See application file for complete search history.

(56) References Cited

U.S. PATENT DOCUMENTS

| | | | |
|---|---|---|---|
| 7,364,315 | B2 | 4/2008 | Chien |
| 9,824,573 | B1 * | 11/2017 | Beres ................ A47C 7/723 |
| 10,624,460 | B2 | 4/2020 | Ma |
| 10,724,731 | B2 | 7/2020 | McNae |
| 2007/0257530 | A1 | 11/2007 | Florez et al. |
| 2016/0280094 | A1 * | 9/2016 | Frye ................ B60N 2/0228 |
| 2016/0360598 | A1 | 12/2016 | Negatu |
| 2017/0067628 | A1 * | 3/2017 | Branch ............. F21V 33/0012 |
| 2018/0086229 | A1 * | 3/2018 | Smuk .................. B60N 2/20 |
| 2018/0306972 | A1 * | 10/2018 | Conrad ............. F21V 19/003 |
| 2018/0317661 | A1 * | 11/2018 | Lutwak ............. A61H 1/0292 |
| 2019/0313803 | A1 | 10/2019 | Liu et al. |
| 2019/0328142 | A1 * | 10/2019 | Ma .................... F21S 9/02 |

(Continued)

FOREIGN PATENT DOCUMENTS

| | | | | |
|---|---|---|---|---|
| CN | 201595453 | U * | 10/2010 | ........ A47C 7/725 |
| CN | 107232832 | A * | 10/2017 | ........... A47C 3/18 |

(Continued)

*Primary Examiner* — Timothy J Brindley
(74) *Attorney, Agent, or Firm* — Boardman & Clark LLP

(57) ABSTRACT

The disclosure provides a chair or seat assembly comprising a seat, a back support, and a support arm coupling the back support to the seat. The support arm comprises an illumination and control assembly. The illumination and control assembly comprises an illuminator, and a controller coupled to the illuminator. The illumination and control assembly further comprises an accelerometer, and the controller is coupled to the accelerometer.

40 Claims, 11 Drawing Sheets

(56) References Cited

U.S. PATENT DOCUMENTS

| | | |
|---|---|---|
| 2020/0326227 A1* | 10/2020 | Lukas ................ A61B 5/6891 |
| 2021/0030159 A1 | 2/2021 | Case |
| 2021/0106140 A1 | 4/2021 | Corrick et al. |
| 2021/0112341 A1* | 4/2021 | Nelson .................... A47C 7/72 |
| 2021/0145184 A1* | 5/2021 | High, Jr. ................ A47C 7/72 |
| 2021/0298476 A1 | 9/2021 | Dardashti |
| 2022/0054881 A1* | 2/2022 | Melnik ............. A63B 21/4031 |
| 2023/0079380 A1* | 3/2023 | Case ....................... A47C 1/00 |
| | | 297/217.3 |
| 2023/0107320 A1* | 4/2023 | Danielescu .............. A47C 7/72 |
| | | 134/1 |
| 2024/0225287 A1* | 7/2024 | Cooper ............. A47C 1/03255 |

FOREIGN PATENT DOCUMENTS

| | | | |
|---|---|---|---|
| CN | 107692601 A | * | 2/2018 |
| CN | 107713441 A | * | 2/2018 |
| CN | 108024638 A | * | 5/2018 |
| CN | 211632494 U | * | 10/2020 |
| CN | 114403627 A | * | 4/2022 |
| KR | 2017114283 A | | 10/2017 |
| KR | 102118908 B1 | * | 6/2020 |
| KR | 102518156 B1 | * | 4/2023 |
| WO | WO-2015077231 A1 | * | 5/2015 ........... B60N 2/0244 |
| WO | 2021103281 A1 | | 6/2021 |

* cited by examiner

CHAIR OR SEAT ASSEMBLY WITH SENSOR AND ILLUMINATION

RELATED APPLICATION

This application claims the benefit of U.S. Patent Application No. 63/351,279, filed Jun. 10, 2022, entitled "CHAIR WITH SENSOR AND ILLUMINATION", the content of which is incorporated herein by reference.

BACKGROUND

In at least one embodiment, the invention relates to chairs or seat assemblies having a sensor. In at least one embodiment, the invention relates to chairs or seat assemblies having illumination. In at least one embodiment, the invention relates to chairs or seat assemblies having a sensor and illumination.

It is known to have a chair including a sensor. An example is provided in U.S. Pat. No. 10,398,233 B2.

It is known to have a chair including light emitting diodes (LEDs). An example is provided in U.S. Pat. No. 11,224,293 B2.

An improved chair with an improved location for a sensor and/or illumination is desired.

SUMMARY

In at least one construction, the disclosure provides a chair or seat assembly comprising a seat, a back support, and a support arm coupling the back support to the seat. The support arm comprises a trough defining a channel. The support arm further comprises an illumination assembly supported by the trough and at least partially disposed in the channel. The illumination assembly comprises an illuminator, and a controller coupled to the illuminator.

The chair or seat assembly can also include one or more of a second back support distinct from the back support, a second support arm coupling the second back support to the seat, a seat support structure coupling the support arm to the seat, a base coupled to the seat support structure, In some constructions, the seat comprises a seat pan coupled to the seat support structure and a cushion supported by the seat pan; the support arm comprises a support arm base, a support arm neck, and a support arm body coupling the support arm base to the support arm neck and including the trough; the support arm includes a wall forming the trough and defining the channel; and/or the wall includes a first wall, a second wall angled from the first wall, and a third wall angled from the first wall, the first wall, the second wall, and the third wall forming the trough and defining the channel.

In some constructions, the illumination assembly includes a support structure having a first side and a second side opposite the first side, at least a portion of the first side of the support structure is disposed in the channel, and the support structure supports the illuminator and the controller.

In some constructions, the illuminator includes an illuminator strip, wherein the support structure includes a wall defining a compartment on the first side to receive the controller and defining a channel on the second side to receive the illumination strip.

In some constructions, the support structure includes a second wall defining a second compartment on the first side to receive a battery and further defining the channel on the second side to receiving the illumination strip.

In some constructions, the illumination assembly further comprises a cover. The cover can include a diffuser cover.

In some constructions, the illumination assembly further comprises an accelerometer coupled to the controller, and wherein the controller controllably illuminates the illuminator based on a signal received from the accelerometer.

In at least one construction, the disclosure provides a chair or seat assembly comprising a seat, a back support, and a support arm coupling the back support to the seat. The support arm comprises a trough defining a channel. The support arm further comprises a control assembly supported by the trough and at least partially disposed in the channel. The illumination assembly comprises an accelerometer, and a controller coupled to the accelerometer.

In some constructions, the control assembly further comprises an illuminator, and the controller comprises a processor and memory. The memory can include instructions executable by the processor to receive signals from the accelerometer, determine movement of the chair based on the signals, and control the illuminator based on the movement of the chair.

In some constructions, the control assembly further includes a communication circuit and antenna. The processor and memory can be communicable with a mobile electronic device via the communication circuit and antenna. The memory can further include instructions executable by the processor to receive an illumination pattern from the mobile electronic device. The controlling of the illuminator can include controlling the illuminator based on the received illumination pattern.

It should also be noted that the illumination assembly and the control assembly can be combined or referred to as a single assembly.

These and other features, advantages, and embodiments of apparatus and/or methods according to the invention are described in, or are apparent from, the following detailed descriptions of various examples of embodiments.

BRIEF DESCRIPTION OF THE DRAWINGS

Various examples of embodiments of the systems, devices, and methods according to this invention will be described in detail, with reference to the following figures.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiment illustrated herein.

Within the scope of this application, it is expressly intended that the various aspects, embodiments, examples, and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

DETAILED DESCRIPTION OF THE DRAWINGS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
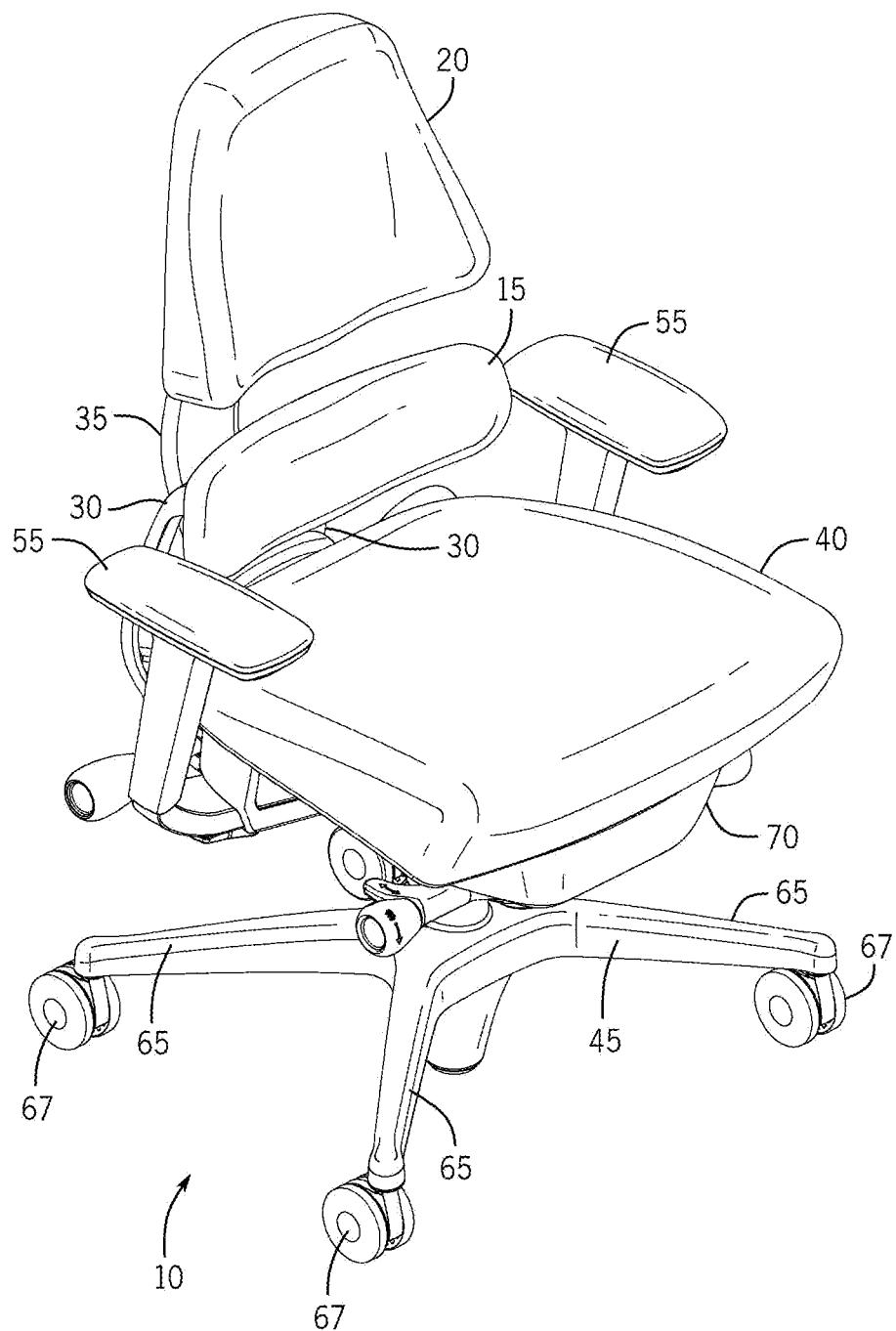
FIG. 1 is a perspective view of a chair incorporating aspects of the invention.
Figure 2:
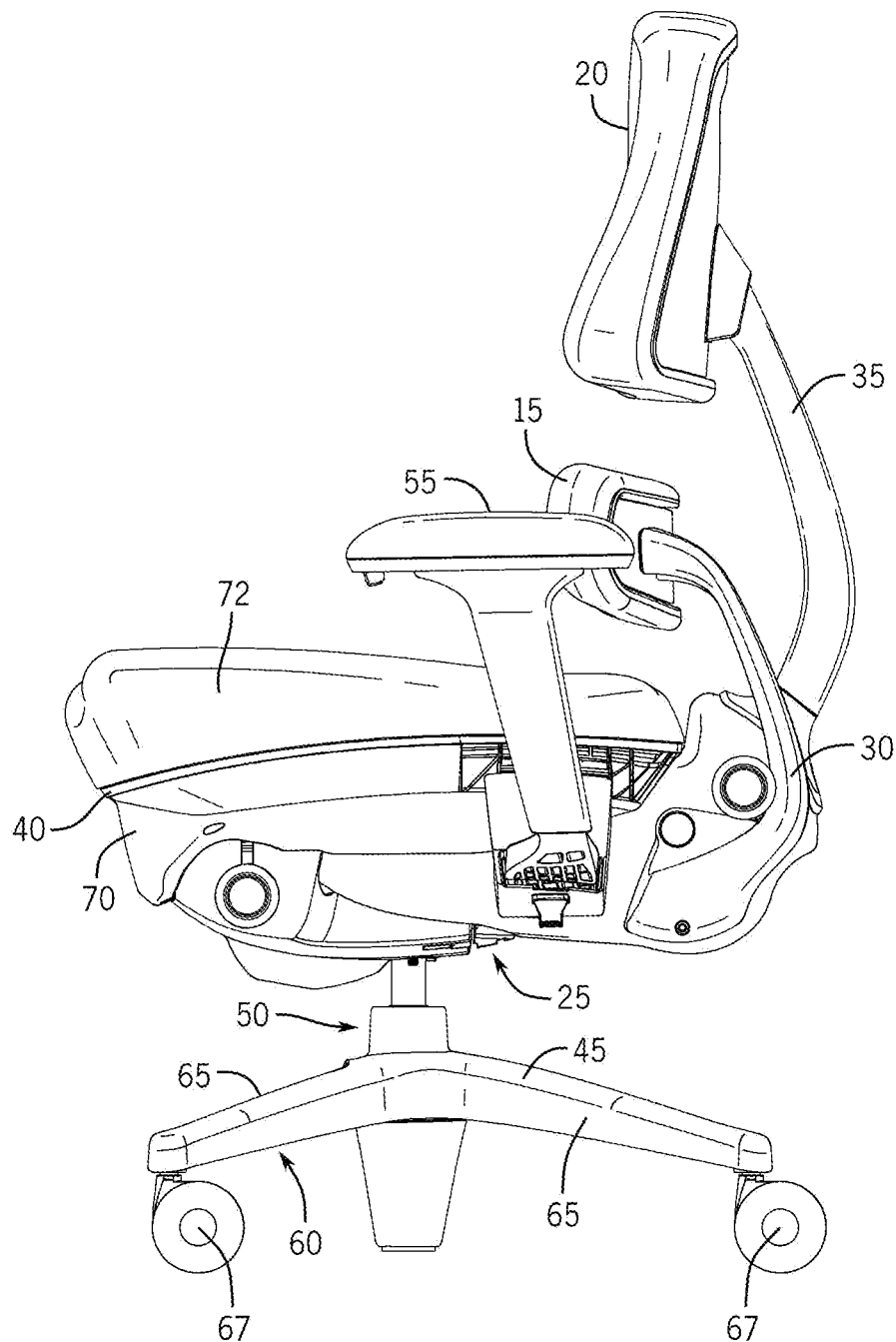
FIG. 2 is a side view of the chair of FIG. 1.

FIGS. 1 and 2 provide a chair 10 including a first back support 15 and a second back support 20. The first back support 15 is a lower back support coupled to a seat support structure 25 via one or more support arms (e.g., first support arms 30). The second back support 20 is an upper back support coupled to the seat support structure 25 via one or more support arms (e.g., second support arm 35).

As shown, the first back support 15 and the second back support 20 are separately connected to the seat support structure 25 of the chair 10. In one example, the first back support 15 and the second back support 20 are interconnected to one another at a common point or axis. Additionally, the second back support 20 is not connected to the seat support structure 25 via the first back support 15, nor is the first back support 15 connected to the seat support structure 25 via the second back support 20. The result of this arrangement makes the first back support 15 and the second back support 20 independently movable. An example of this arrangement is disclosed in U.S. Pat. No. 11,641,944, which is incorporated herein by reference. Any additional support arms for additional back supports may also be coupled to the seat support structure 25 such that the additional support arms rotate about the same or similar pivot axis.

The first support arms 30 and the second support arm 35 are independently movable such that the first back support 15 and the second back support 20 can move independently relative to each other through a broad range of motion. That is, the first support arms 30 and the second support arm 35 allow independent forward and backward movement of each of the first back support 15 and the second back support 20 relative to a seat 40 of the chair 10 by adjusting the angle of the respective the first support arms 30 and the second support arm 35. In some examples, to enable the independent forward and backward movement of the first back support 15 and the second back support 20, the first support arms 30 are offset from a center of the first back support 15 and positioned on either side of the second back support 20 so that the first support arms 30 and the second support arm 35 do not interfere with one another when the first back support 15 and the second back support 20 are adjusted. For the shown example, the first support arms 30 and the second support arm 35 are also shaped (e.g., curved, angled, etc.) to allow independent movement through a broad range of angles without interference.

Alternatively, a single support arm may be used for the first back support 15 and two offset support arms may be used for the second back support 20 and positioned on either side of the single support arm. In other examples, one support arm may be used for each of the first back support 15 and the second back support 20 and one or both of the support arms may be curved in a way to prevent interference while also contacting a center portion of each of the back supports. In further alternative examples, each of the back supports may be coupled to the seat support structure using multiple support arms.

Additionally or alternatively, each of the first back support 15 and the second back support 20 may be independently height adjustable. The example first and second support arms may be extendible to adjust the height of the respective first and second back supports.

While the first back support 15 and the second back support 20 in FIGS. 1 and 2 are shown as separate back supports, the first and second back supports may be connected using any flexible means of flexible membrane, which may include a cover over the supports or may just stretch between the supports, that enables adjustment of at least one back support relative to the other back support. The flexible membrane may include fabric, foam, mesh, a spring or springs, or any other flexible connection. Similarly, while the first back support 15 and the second back support 20 are depicted as being separate from the seat 40, the lower back support may be connected to the seat 40 using any of the flexible membrane which allows movement of the back support relative to the seat 40. Additionally or alternatively, a flexible fabric or material (including a foam) may cover one or more of the seat 40, the first back support 15, and the second back support 20. That is, one or more of the seat 40, the first back support 15, or the second back support 20 may be covered together and/or separately using upholstery, which may include a foam layer.

In some examples, additional back supports (e.g., a neck support) may be connected to the seat support structure 25 via one or more additional support arms. In even further examples, aspects of the invention can be used in a singular seat back support combination.

The illustrated construction of FIGS. 1 and 2 depicts the seat 40, the first back support 15, and the second back support 20 in use with an example office or task or gaming chair. The seat 40 in the example construction is attached to the seat support structure 25. The seat support structure 25 is coupled to a base 45 via a piston assembly 50. The example office chair may also include arm rests 55. Additionally or alternatively, the seat 40, the first back support 15, and the second back support 20 as described herein may be used in other environments. For example, the configurations of the seat 40, the first back support 15, and the second back support 20 may be used in a vehicle, an airplane, an entertainment venue, industrial and/or farming equipment, or generally in any type of chair or seat in which the user is expected to sit in a plurality of positions for long periods of time, ideally with positive comfort over time. The design of the seat 40, the first back support 15, and the second back support 20 can be adapted for use in a plurality of other seating situations, for example, by attaching the seat 40 to a different base and the first back support 15 and the second back support 20 to a different type of back frame and/or seat. The seat 40, the first back support 15, and/or the second back support 20 may also be used with solutions for mobility challenged users (e.g., wheelchairs (both manual and power), feeder seats, strollers, bathing chairs, adaptive car seats, other durable medical equipment, etc.). It is also envisioned that aspects of the invention may be used in more traditional seating, such as an office chair with a singular back support.

The shown chair 10 has the base 45. The shown base 45 includes a leg assembly 60 including four legs 65 and the piston assembly 50. The piston assembly 50 is height adjustable. A caster 67 or coaster may be attached to the end of each leg 65.

The piston assembly 50 couples the base 45 to the seat 40 at the seat support structure 25. In the construction shown, the seat support structure 25 supports a seat pan 70 holding a cushion 72, receives the first support arms 30 and the second support arm 35 supporting the first back support 15 and the second back support 20, and includes the mechanisms to aid in adjusting the chair 10 including the first back support 15 and the second back support 20.

Figure 4:
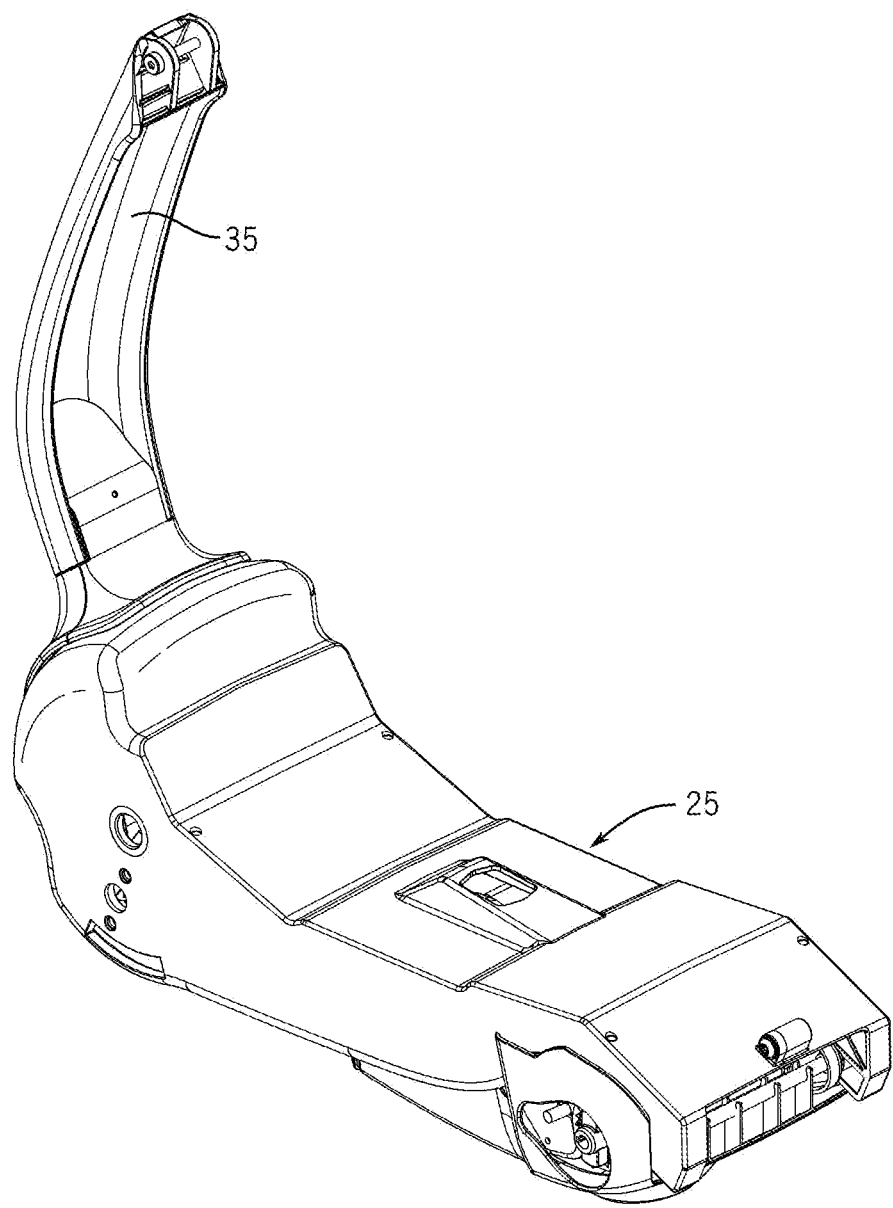
FIG. 4 is a perspective view of the second support arm and the seat support structure of the chair of FIG. 1.
Figure 5:
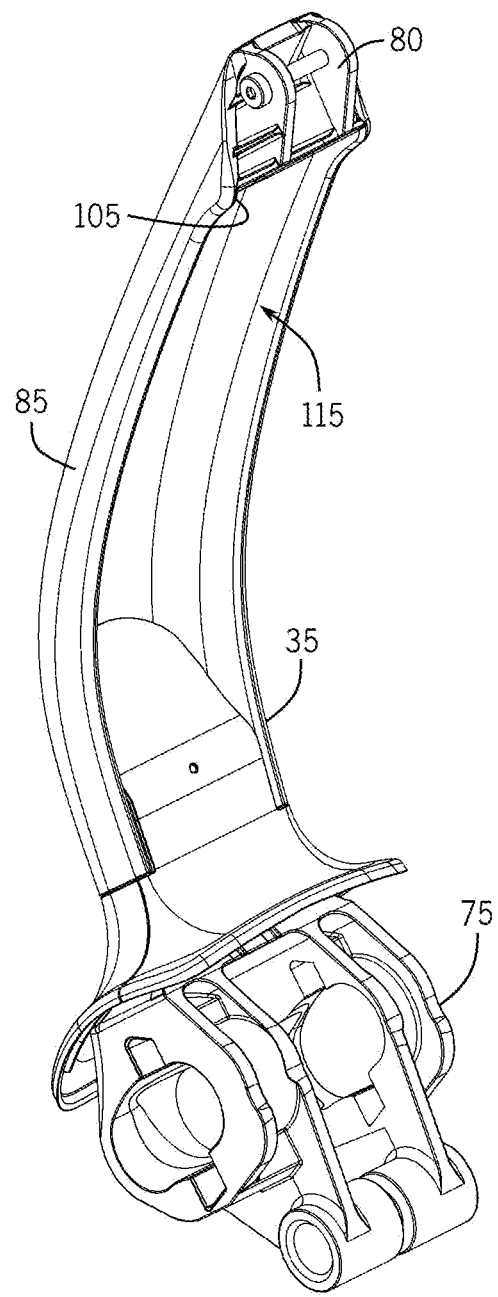
FIG. 5 is a perspective view of the second support arm of the chair of FIG. 1.

The seat support structure 25 and the second support arm 35 are shown in FIG. 4. FIG. 5 shows the second support arm 35. The shown second support arm 35 represents some aspects of embodiments of the invention. The second support arm 35 includes a support arm base 75. The support arm base 75 helps couple the second support arm 35 to the seat support structure 25.

On the other end of the second support arm 35, for the shown construction, is a support arm neck 80. The support arm neck 80 helps couple the second support arm 35 to the second back support 20.

Between the support arm base and the support arm neck is the support arm body 85 (may also be referred to as the support column). The support arm body 85 is an arcuate upright shaft that supports the overhead structure of the second back support 20 via the support arm neck 80.

Figure 3:
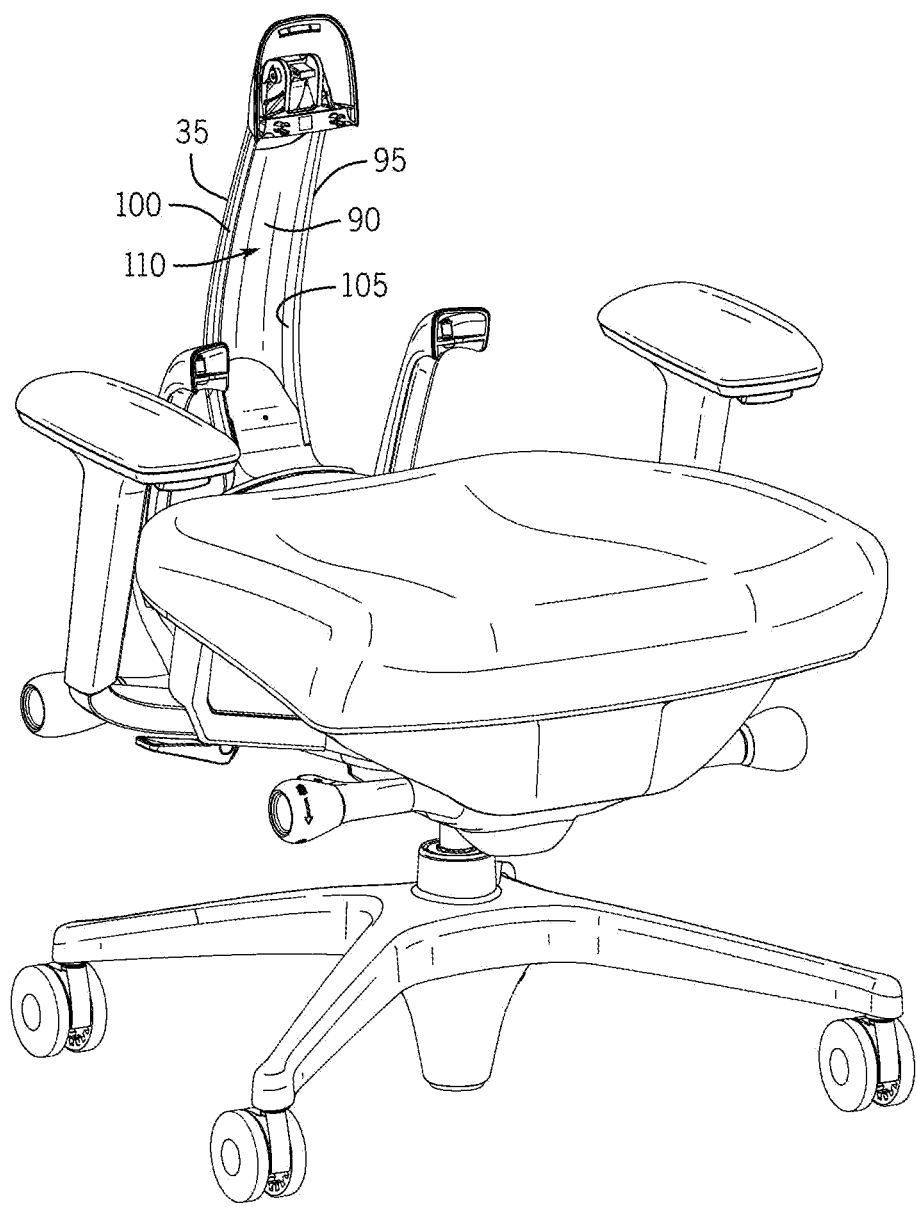
FIG. 3 is a perspective view of the chair of FIG. 1 with the first seat back, the second seat back, and the illumination and control assembly removed.

As best shown in FIG. 3, the support arm body 85 includes a first wall 90, a second wall 95 angled from the first wall 90 by a bend, and a third wall 100 angled from the first wall 90 by a bend. The three walls form a trough 105 having a channel 110. While the shown support arm body 85 includes three walls forming the trough 105, other designs are possible including more or less walls. The trough 105 forms the channel 110 or space that receives an illumination and control assembly 115 (may also be referred to at times as only the illumination assembly or the control assembly). This is best shown in FIGS. 3 and 5.

Figure 6:
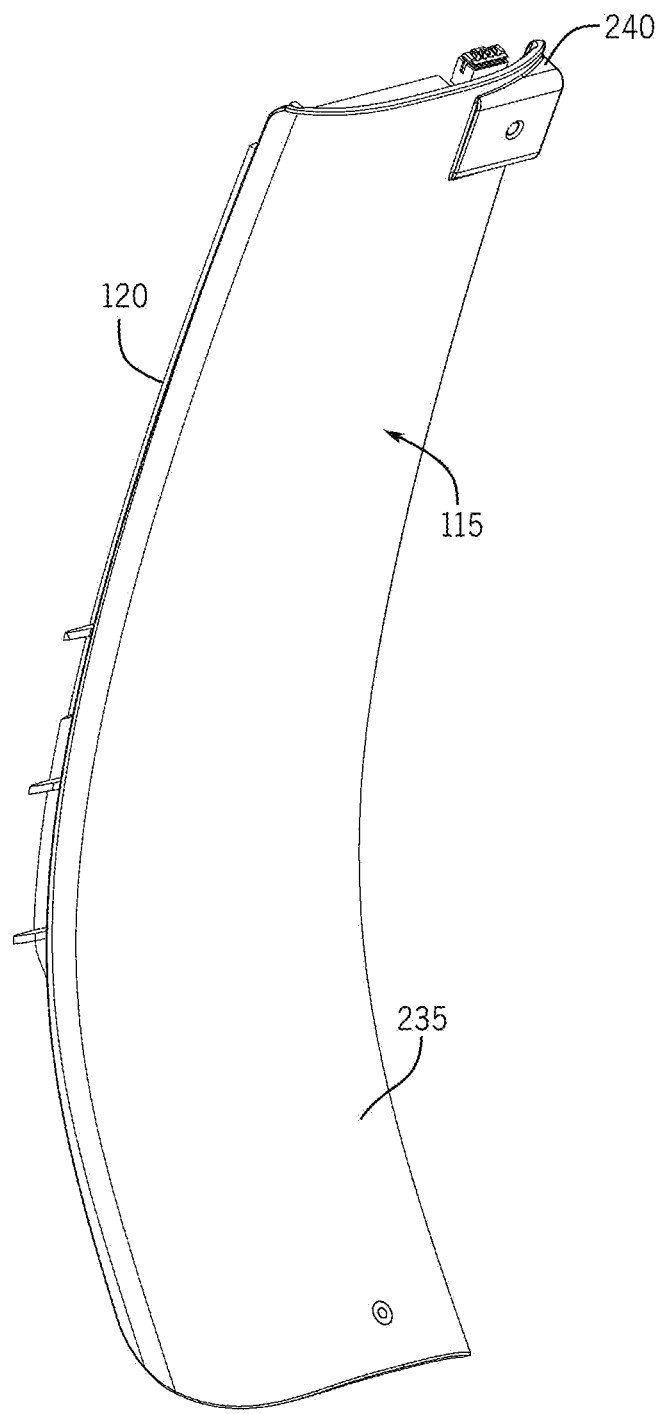
FIG. 6 is a perspective view of the illumination and control assembly of the chair of FIG. 1.
Figure 7:
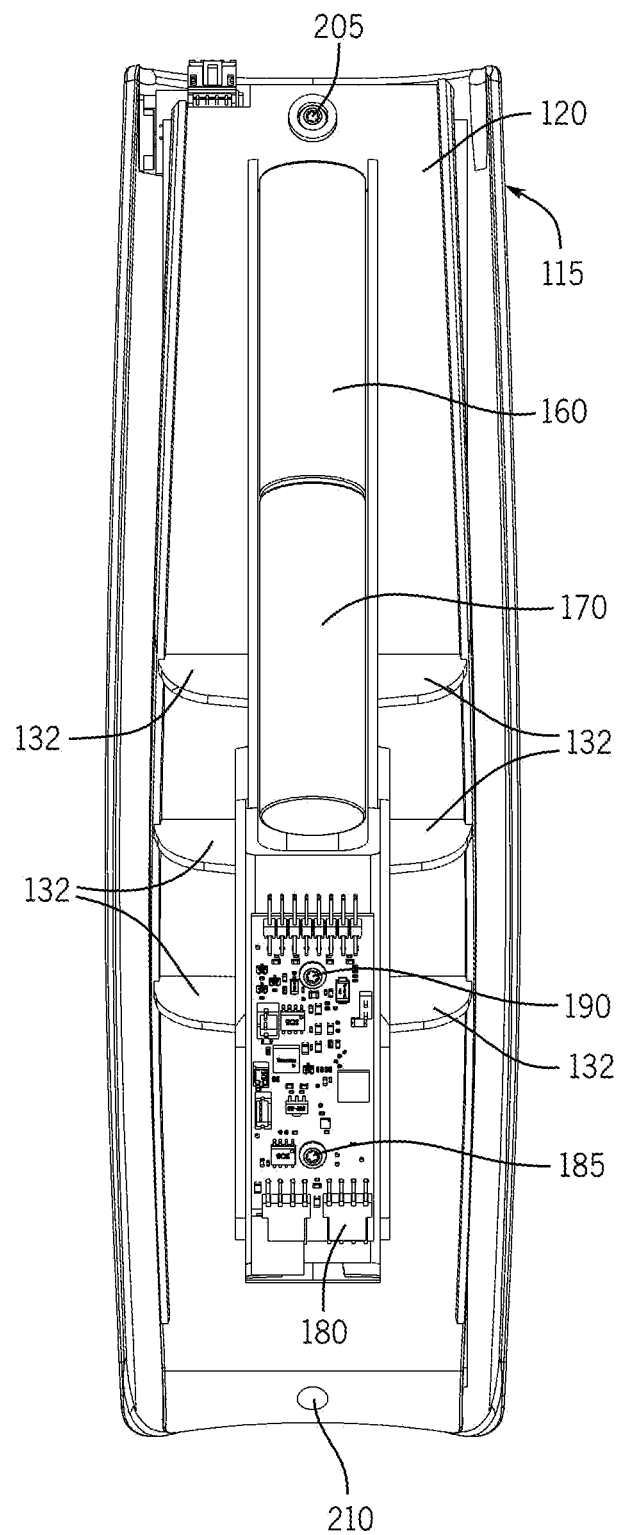
FIG. 7 is a rear view of the illumination and control assembly of FIG. 6.
Figure 8:
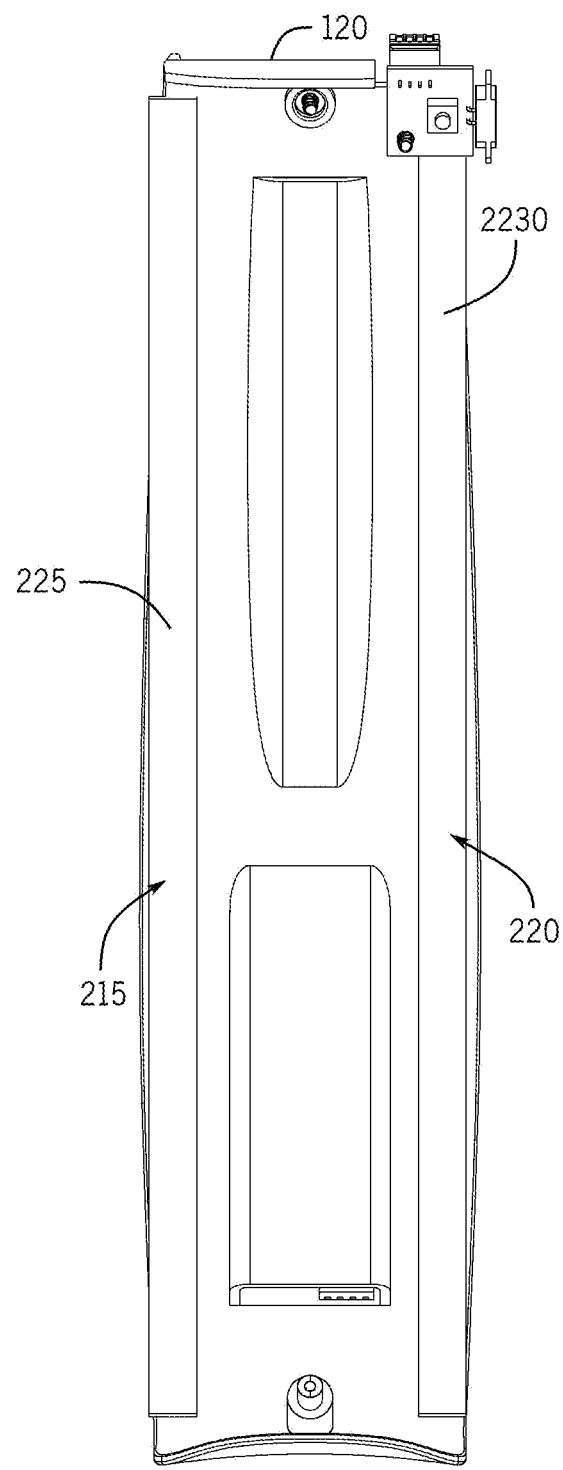
FIG. 8 is a front view of the illumination and control assembly of FIG. 6 with the cover removed.
Figure 9:
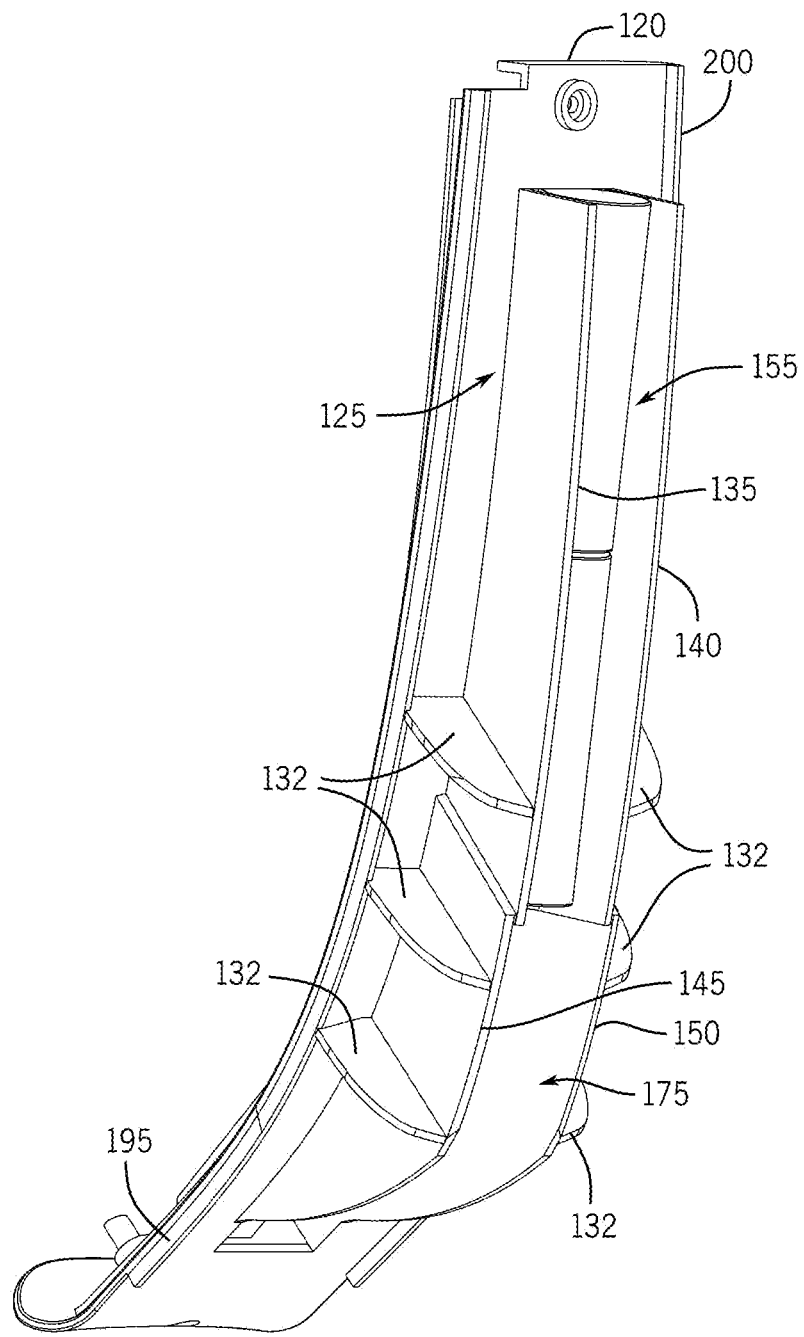
FIG. 9 is a rear perspective view of the support structure for the illumination and control assembly of FIG. 6.
Figure 10:
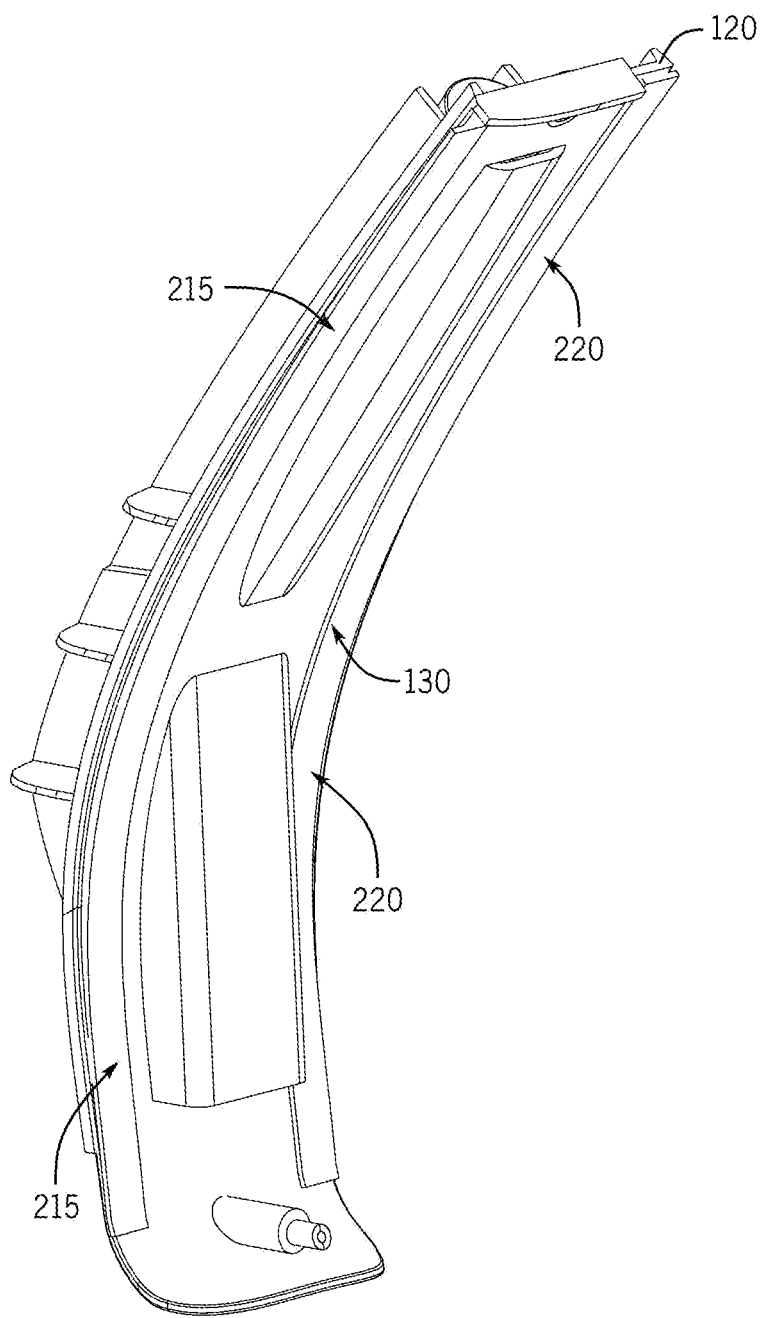
FIG. 10 is a front perspective view of the support structure for the illumination and control assembly of FIG. 6.

FIGS. 6-8 show the illumination and control assembly 115 includes a support structure 120 (may also be referred to as a frame). FIGS. 9 and 10 show the support structure 120 having a first side 125 and a second side 130. With reference to FIGS. 6-10, on the first side 125 of the support structure 120 are ribs 132 to help place and support the illumination and control assembly 115 in the channel 110 of the trough 105. The first side 125 further includes a plurality of walls 135, 140, 145, 150 defining one or more compartments. In the shown construction, the support includes a first compartment 155 for receiving a plurality of batteries 160, 170 and a second compartment 175 for receiving a control board 180. The control board 180 is secured to the support structure by fasteners 185, 190. The fasteners 185, 190 shown include screws received by apertures. The plurality of batteries 160, 170 is also secured to the support structure 120 by fasteners. For example, the support structure 120 can include a snap-fit receptacle to receive the batteries and/or can include adhesives to help fasten the batteries.

The shown support structure 120 includes guides 195, 200 to help place the first side 125 of the illumination and control assembly 115 within the channel 110 of the trough 105. The illumination and control assembly 115 can be secured to the support arm body 85 by fasteners 205, 210. In the shown construction, the fasteners are screws received by apertures.

On the second side 130 of the support structure 120, the first compartment 155 and the second compartment 175 help to define channels or spaces 215, 220 for receiving illumination strips 225, 230. For the example shown, the illumination strips 225, 230 include light emitting diodes (LEDs), which can be multiple colors. As will be discussed further below, the control board 180 controls the illumination strips 225, 230 to prove a scene.

Covering the second side 130 and the illumination strips 225, 230, is a cover 235. In the shown construction, the cover 235 includes a diffuser to help defuse the light emanating from the illumination strips 225, 230. The cover 235 may also be referred to as a diffuser cover. The diffuser can be a layer coupled with a cover layer (e.g., a clear cover). Additionally or alternatively, the diffuser may be integrated within the cover 235.

Included with cover 235 is a power connector 240. For the shown illumination and control assembly 115, the power connector 240 includes a magnetic breakaway power connector. Also included at the power connector 240 is a power supply 250, as will be discussed below.

Figure 11:
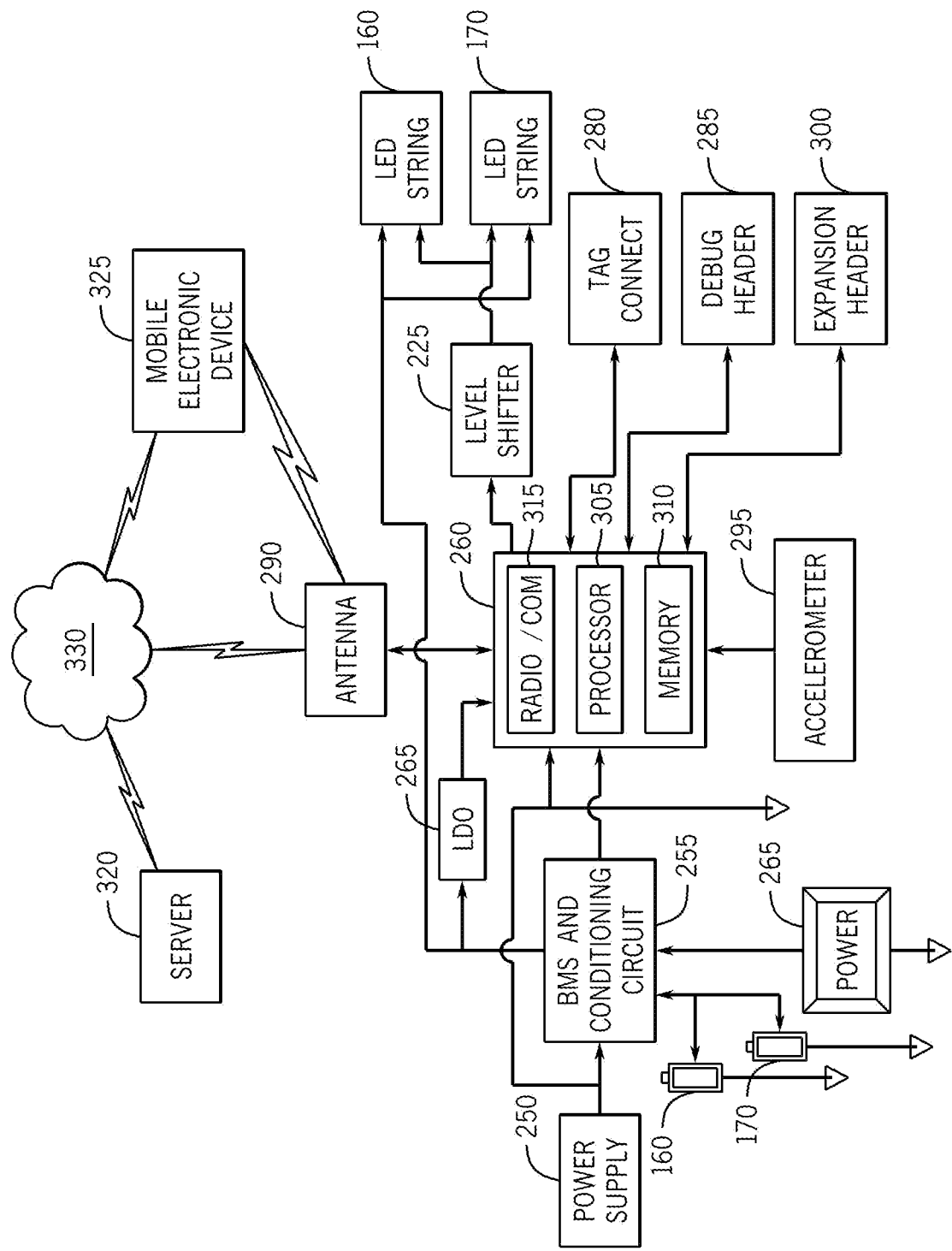
FIG. 11 is a block diagram representing the electrical components the illumination and control assembly of FIG. 6.

A block diagram for the electrical elements of the chair 10 is provide in FIG. 11. The power supply 250 is coupled to a mating power connector (not shown) via the power connector 240. The power supply 250 receives power from the connection and provides a continuous direct current (DC) power supply. The power supply 250 provides power to a BMS and conditioning circuit 255. The power supply 250 also provides a signal to a controller 260 indicating a power source is connected to the power supply 250.

The BMS and conditioning circuit 255 includes a battery management system (BMS) to control charge and discharge to the batteries 160, 170. The BMS and conditioning circuit 255 also includes conditioning circuitry that provides one or more battery voltages to the LDO circuit 265 and the illumination strips 225, 230. The illumination strips 225, 230 are shown in FIG. 20 as LED light strips. Communication and control can occur between the BMS and conditioning circuit 255 and the controller 260.

The chair 10 also includes a power button 270 that can wake up or cause the chair 10 to sleep. The power button 270 can also be used to provide a signal to the controller 260 (via the BMS and conditioning circuit 255) to initiate a programming event.

The LDO circuit 265 is a low dropout (LDO) voltage regulator that provides a steady voltage to the controller 260 from the BMS and conditioning circuit 255. The BMS and conditioning circuit 255 also provides one or more DC voltages to the illumination strips 225, 230.

A level shifter circuit 275 controls the voltage provided to the illumination strips 225, 230 based on control or command signals from the controller 260. For example, the level shifter circuit 275 controls a voltage or current provided to the illumination strips 225, 230 and possibly groups of LEDs in the illumination strips 225, 230. Through the use of the level shifter circuit 275, the illumination strips 225, 230 can provide basic effects such as dimming/brightness, color selection, and flashing or intermittence. The controller 260 can build upon the basic effects to provide more complex color scenes such as chasing, waterfall, profiles or color schemes, etc. While a controller 260 and level shifter circuit 275 are shown, other illumination driving techniques for controlling the illumination strips 225, 230 can be used in alterative to the embodiment shown as is known by one skilled in the art.

The tag connect 280 and the debug header 285 allow for communication with the controller 260 for programming, debugging, and acquiring data to and from the controller 260 via a wired connection.

An antenna 290 allows for the controller 260, and more broadly the chair 10, to wirelessly communicate with an external electronic device. The external electronic device can be a user smart device or a network node. An example network node is a wireless local area network provided by a Wi-Fi network node.

The chair includes an accelerometer 295 on the control board 180 in communication with the controller 260. The accelerometer 295 senses movement of the chair 10 and provides a signal to the controller based on sensed movements. For example, a chair 10 movement indicates a person is present and the illumination strips 225, 230 can light in response to the movement of the chair 10. As another example, as being within the trough 105, the accelerometer 295 can sense movement of the second support arm 35, thereby indicating a user has set in the chair 10. It is also envisioned that the accelerometer 295 can be placed elsewhere. Additionally or alternatively, additional accelerometers can be added to other locations of the chair 10 and in communication with the controller 260 via the expansion header 300, and/or other sensor types can be added to the chair 10 and in communication with the controller 260 via the expansion header 300.

For the example shown, the controller 260 includes a processor 305 and a memory 310. It is contemplated that the processor 305 and memory 310 may each be a single electronic device or formed from multiple devices.

The processor 305 can include a component or group of components that are configured to execute, implement, and/or perform any of the processes or functions described herein for the chair 10 or a form of instructions to carry out such processes or cause such processes to be performed. Examples of suitable processors include a microprocessor, a microcontroller, and other circuitry that can execute software/firmware. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry.

The memory 310 includes memory for storing one or more types of instructions and/or data. The memory 310 can be a component of the processor, can be operatively connected to the processor for use thereby, or a combination of both.

In one or more arrangements, the memory 310 can include various instructions stored thereon. For example, the memory 310 can store one or more modules. Modules can be or include computer-readable instructions that, when executed by the processor, cause the processor to perform the various functions disclosed for the module. While functions may be described herein for purposes of brevity, it is noted that the functions for the chair are performed by the processor 305 using the instructions stored on or included in the various modules. One or more programs or modules may be stored in the memory for execution by the processor 305.

The memory 310 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 310 can be a component of the processor 305, can be operatively connected to the processor 305 for use thereby, or a combination of both.

Some modules may be stored remotely and accessible by the processor 305 using, for instance, various communication devices and protocols. One or more programs or modules may be stored in the memory 310 for execution by the processor 305.

Before proceeding, it should be understood by somebody skilled in the art that the controller 260 can includes many additional conventional elements typically found in a control system. Further discussion regarding these components is not provided herein since the components are conventional and their operation are conventional.

The chair 10 can communicate wirelessly (e.g., via a radio 315 coupled to the antenna 290) with a sever 320 or a mobile electronic device 325. An example of a radio 315 includes a wireless local area network (WLAN) radio and/or a cellular radio. The radio 315 can be a standalone circuit element or can be part of the controller 260. With a WLAN radio, the controller 260 generally communicates over a short-range wireless communication network 330. With a cellular radio, the controller 260 generally communicates over a cellular communication network (e.g., 4G, LTE, 5G, etc.). In one implementation, the radio 315 includes a communication controller, and a transceiver for transmitting and receiving signals to and from the chair 10 via the antenna 290.

The mobile electronic device 325 can be wirelessly directly coupled to the chair 10 and, alternatively or additionally, either the chair 10 or the mobile electronic device 325 can be coupled to the network 330, which can include the Internet among numerous other networks. The mobile electronic device 325 can communicate wirelessly (e.g., via its radio) with the sever 325.

The mobile electronic device 325 executes an application (or app), which is stored in memory of the electronic device as is well known. An application or app includes, but is not limited to, a software application. Generally, apps are available through app stores such as Apple's iTunes®, Google's Play Store®, Microsoft's App Store™, Blackberry®, and so forth. Apps are usually run on mobile-based operating systems running on iPhones®, iPads®, Android® Phones, Android® Tablets, Apple TV®, Google TV®, and many other similar devices, but can also be run on other operating systems, such as an operating system for a desktop computer. Some example operations related to the app are provided herein. The descriptions of the operations relate to their functionality are in terms of the app. This is intended to mean that the app is stored in the memory of the mobile electronic device 325 and includes processor-executable instructions that, when executed on the processor, cause the processor to perform the functionality described (in combination with other portions of the memory, as well as various hardware components of the electronic device (such as the user interface or the radio, for example)).

In one example operation, the chair 10 can operate the illumination strips 225, 230 in response to the accelerometer 295 sensing movement and/or input from the power button 270. The control of the illumination strips 225, 230 can be based on a program or profile in the memory 310 of the controller 260. The profile can be stored in the memory 310 via the antenna 290 receiving the profile from the external electronic device (e.g., the smart device) 325.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further and unless explicitly noted, the terms and phrases used herein are not intended to be limiting but rather to provide an understandable description of possible implementations. Various implementations are shown in the drawings, but the implementations are not limited to the illustrated structure or application.

One or more of the disclosed embodiments, alone or in combination, may provide one or more technical effects. The technical effects and technical problems in the specification are exemplary and are not limiting. It should be noted that the embodiments described in the specification may have other technical effects and can solve other technical problems.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (e.g., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC, or ABC).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom", "front" and "back, and "left" and "right") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

The terms fixedly, non-fixedly, and removably, and variations thereof, may be used herein. The term fix, and variations thereof, refer to making firm, stable, or stationary. It should be understood, though, that fixed doesn't necessarily mean permanent-rather, only that a significant or abnormal amount of work needs to be used to make unfixed. The term removably, and variations thereof, refer to readily changing the location, position, or station. Removably is meant to be the antonym of fixedly herein. Alternatively, the term non-fixedly can be used to be the antonym of fixedly.

Although only a few embodiments have been described in detail in this disclosure, those skilled in the art who review this disclosure will readily appreciate that many various alternatives, modifications, variations, improvements and/or substantial equivalents, whether known or that are or may be presently foreseen, are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes, and omissions may be made in the design, operating conditions, and arrangement of the various examples of embodiments without departing from the spirit or scope of the present inventions. Therefore, the invention is intended to embrace all known or earlier developed alternatives, modifications, variations, improvements and/or substantial equivalents.

Reference should be made to the following claims, rather than to the foregoing specification, as indicating the scope hereof.

The invention claimed is:

1. A chair or seat assembly comprising:
    a seat;
    a back support; and
    a support arm coupling the back support to the seat, the support arm comprising:
        a support arm base;
        a support arm neck;
        a support arm body coupling the support arm base to the support to the support arm neck;
        a trough defining a channel; and
        an illumination assembly supported by the trough and at least partially disposed in the channel, the illumination assembly comprising:
            an illuminator; and
            a controller coupled to the illuminator.

2. The chair or seat assembly of claim 1, further comprising:

a second back support distinct from the back support; and
a second support arm coupling the second back support to the seat.

3. The chair or seat assembly of claim 1, further comprising a seat support structure coupling the support arm to the seat.

4. The chair or seat assembly of claim 3, further comprising a base coupled to the seat support structure, and wherein the seat comprises a seat pan coupled to the seat support structure and a cushion supported by the seat pan.

5. The chair or seat assembly of claim 1, wherein the support arm includes a wall forming the trough and defining the channel.

6. The chair or seat assembly of claim 5, wherein the wall includes a first wall, a second wall angled from the first wall, and a third wall angled from the first wall, and wherein the first wall, the second wall, and the third wall forms the trough and defines the channel.

7. The chair or seat assembly of claim 1, wherein the illumination assembly includes a support structure having a first side and a second side opposite the first side, wherein at least a portion of the first side of the support structure is disposed in the channel, and wherein support structure supports the illuminator and the controller.

8. The chair or seat assembly of claim 7, wherein the illuminator includes an illuminator strip, wherein the support structure includes a wall defining a compartment on the first side to receive the controller and defining a channel on the second side to receive the illumination strip.

9. The chair or seat assembly of claim 8, wherein the support structure includes a second wall defining a second compartment on the first side to receive a battery and further defining the channel on the second side to receive the illumination strip.

10. The chair or seat assembly of claim 8, wherein the illuminator includes a light-emitting diode (LED), and wherein the illumination strip includes an LED strip.

11. The chair or seat assembly of claim 7, wherein the illumination assembly further comprises a cover.

12. The chair or seat assembly of claim 11, wherein the cover includes a diffuser cover.

13. The chair or seat assembly of claim 1, wherein the illumination assembly further comprises an accelerometer coupled to the controller, and wherein the controller controllably illuminates the illuminator based on a signal received from the accelerometer.

14. A chair or seat assembly comprising:
a seat;
a back support; and
a support arm coupling the back support to the seat, the support arm comprising:
    a trough defining a channel; and
    a control assembly supported by the trough and at least partially disposed in the channel, the control assembly comprising:
        an illuminator;
        an accelerometer; and
        a controller coupled to the accelerometer, the controller comprising a processor and memory, the memory including instructions executable by the processor to:
            receive signals from the accelerometer;
            determine movement of the chair based on the signals; and
            control the illuminator based on the movement of the chair.

15. The chair or seat assembly of claim 14, wherein the illuminator includes an illumination strip of light-emitting diodes.

16. The chair or seat assembly of claim 14, wherein the control assembly further includes a communication circuit and antenna, wherein the processor and memory are communicable with a mobile electronic device via the communication circuit and antenna, and wherein the memory further includes instructions executable by the processor to receive an illumination pattern from the mobile electronic device, and the controlling the illuminator includes controlling the illuminator based on the received illumination pattern.

17. A chair or seat assembly comprising:
a seat;
a back support; and
a support arm comprising a support arm base coupled to the seat, a support arm neck coupled to the back support, and a support arm body coupling the support arm base to the support arm neck and, the support arm body having a wall forming a trough defining a channel with an illumination and control assembly supported by the trough and at least partially disposed in the channel, the illumination and control assembly comprising:
    an accelerometer;
    an illumination strip of light-emitting diodes; and
    a controller coupled to the accelerometer and the illuminator, the controller comprises a processor and memory, the memory including instructions executable by the processor to:
        receive signals from the accelerometer;
        determine movement of the chair based on the signals; and
        control the illuminator based on the movement of the chair.

18. The chair or seat assembly of claim 17, wherein the control assembly further includes a communication circuit and antenna, wherein the processor and memory are communicable with a mobile electronic device via the communication circuit and antenna, and wherein the memory further includes instructions executable by the processor to receive an illumination pattern from the mobile electronic device, and the control of the illumination strip includes controlling the illumination strip based on the received illumination pattern.

19. The chair or seat assembly of claim 17, wherein illumination and control assembly further comprises a support structure having a first side and a second side opposite the first side, wherein at least a portion of the first side of the support structure is disposed in the channel, and wherein the support structure includes a wall defining a compartment on the first side to receive the controller and defining a channel on the second side to receive the illumination strip.

20. The chair or seat assembly of claim 19, wherein the support structure includes a second wall defining a second compartment on the first side to receive a battery and further defining the channel on the second side to receive the illumination strip.

21. A chair or seat assembly comprising:
a seat;
a back support; and
a support arm coupling the back support to the seat, the support arm comprising:
    a trough defining a channel; and
    an illumination assembly supported by the trough and at least partially disposed in the channel, the illumination assembly comprising:

an illuminator;

a controller coupled to the illuminator; and a support structure having a first side and a second side opposite the first side, wherein at least a portion of the first side of the support structure is disposed in the channel, and wherein the support structure supports the illuminator and the controller.

22. The chair or seat assembly of claim 21, further comprising:

a second back support distinct from the back support; and a second support arm coupling the second back support to the seat.

23. The chair or seat assembly of claim 21, further comprising a seat support structure coupling the support arm to the seat.

24. The chair or seat assembly of claim 23, further comprising a base coupled to the seat support structure, and wherein the seat comprises a seat pan coupled to the seat support structure and a cushion supported by the seat pan.

25. The chair or seat assembly of claim 21, wherein the support arm includes a wall forming the trough and defining the channel.

26. The chair or seat assembly of claim 25, wherein the wall includes a first wall, a second wall angled from the first wall, and a third wall angled from the first wall, and wherein the first wall, the second wall, and the third wall forms the trough and defines the channel.

27. The chair or seat assembly of claim 21, wherein the illuminator includes an illuminator strip, wherein the support structure includes a wall defining a compartment on the first side to receive the controller and defining a channel on the second side to receive the illumination strip.

28. The chair or seat assembly of claim 27, wherein the support structure includes a second wall defining a second compartment on the first side to receive a battery and further defining the channel on the second side to receive the illumination strip.

29. The chair or seat assembly of claim 27, wherein the illuminator includes a light-emitting diode (LED), and wherein the illumination strip includes an LED strip.

30. The chair or seat assembly of claim 21, wherein the illumination assembly further comprises a cover.

31. The chair or seat assembly of claim 30, wherein the cover includes a diffuser cover.

32. The chair or seat assembly of claim 21, wherein the illumination assembly further comprises an accelerometer coupled to the controller, and wherein the controller controllably illuminates the illuminator based on a signal received from the accelerometer.

33. A chair or seat assembly comprising:

a seat;

a back support; and a support arm coupling the back support to the seat, the support arm comprising:

a trough defining a channel; and an illumination assembly supported by the trough and at least partially disposed in the channel, the illumination assembly comprising:

an illuminator;

a controller coupled to the illuminator; and an accelerometer coupled to the controller, wherein the controller controllably illuminates the illuminator based on a signal received from the accelerometer.

34. The chair or seat assembly of claim 33, further comprising:

a second back support distinct from the back support; and a second support arm coupling the second back support to the seat.

35. The chair or seat assembly of claim 33, further comprising a seat support structure coupling the support arm to the seat.

36. The chair or seat assembly of claim 35, further comprising a base coupled to the seat support structure, and wherein the seat comprises a seat pan coupled to the seat support structure and a cushion supported by the seat pan.

37. The chair or seat assembly of claim 33, wherein the support arm includes a wall forming the trough and defining the channel.

38. The chair or seat assembly of claim 37, wherein the wall includes a first wall, a second wall angled from the first wall, and a third wall angled from the first wall, and wherein the first wall, the second wall, and the third wall forms the trough and defines the channel.

39. The chair or seat assembly of claim 33, wherein the illumination assembly further comprises a cover.

40. The chair or seat assembly of claim 39, wherein the cover includes a diffuser cover.

* * * * *